Sept. 4, 1923.
A. WASSILIEFF
CAMERA
Filed Dec. 13, 1916
1,466,774
4 Sheets-Sheet 2
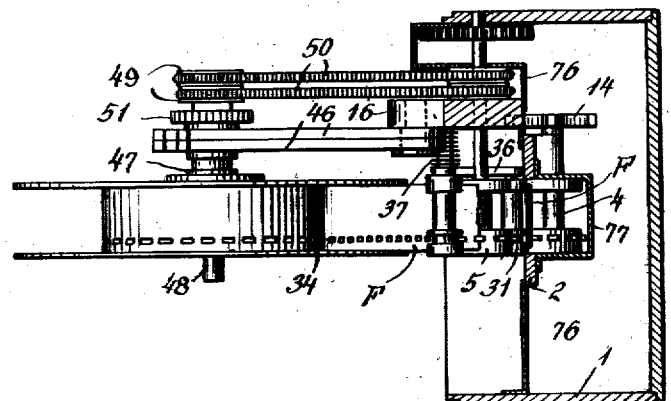
Fig.2.
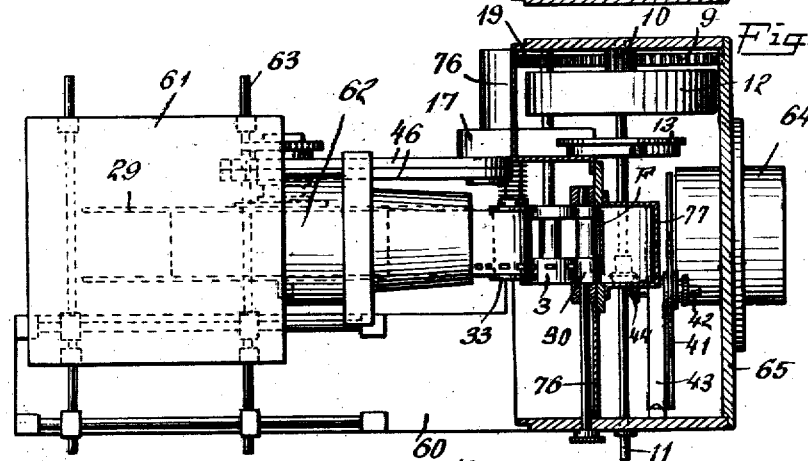
Fig.3.
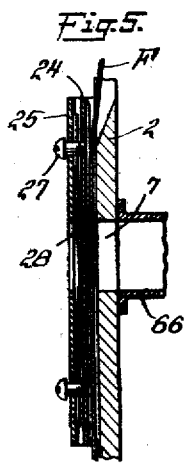
Fig.5.
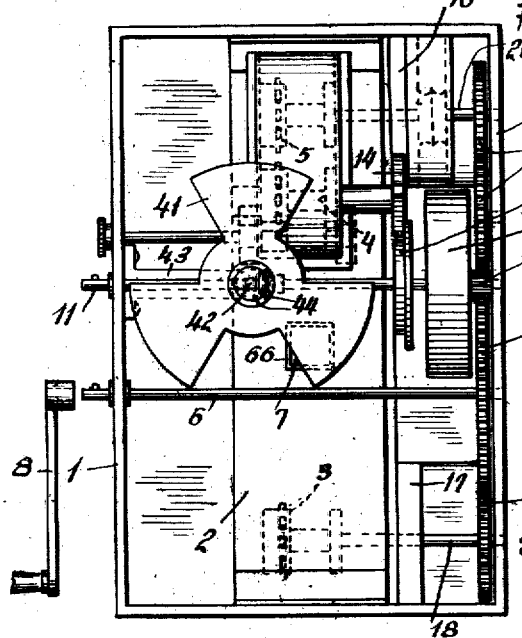
Fig.4.
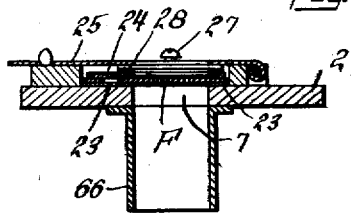
Fig.6.
Fig.7.
Inventor
Alexander Wassilieff
By his Attorneys
Pennie, Davis & Marvin

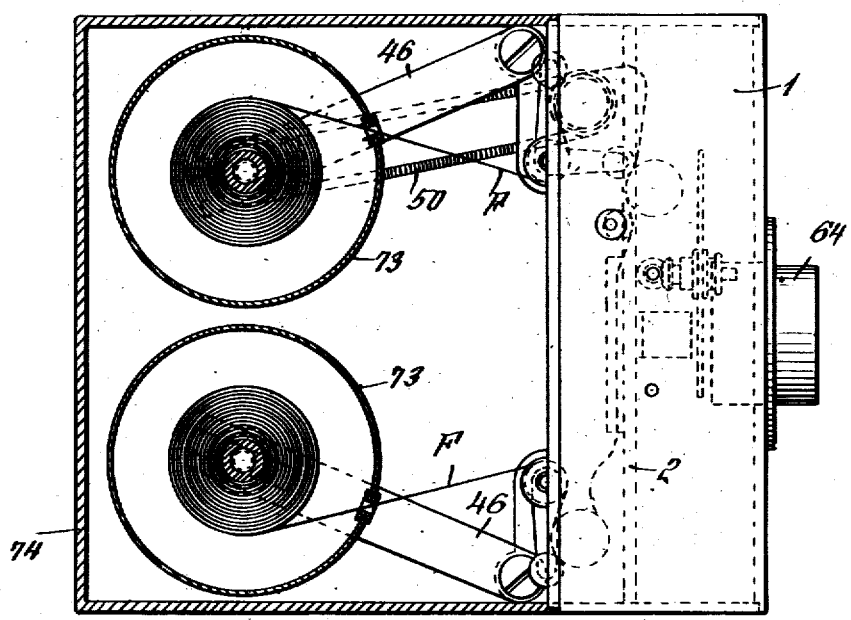
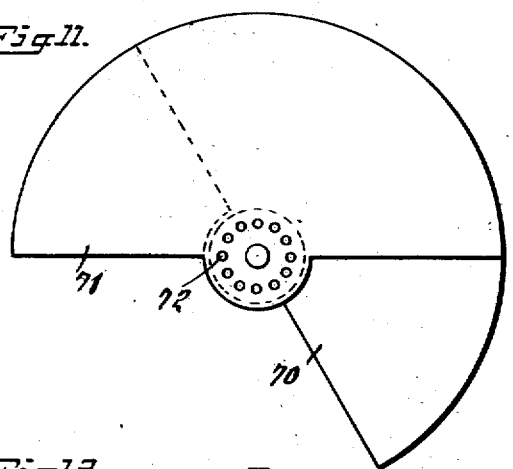
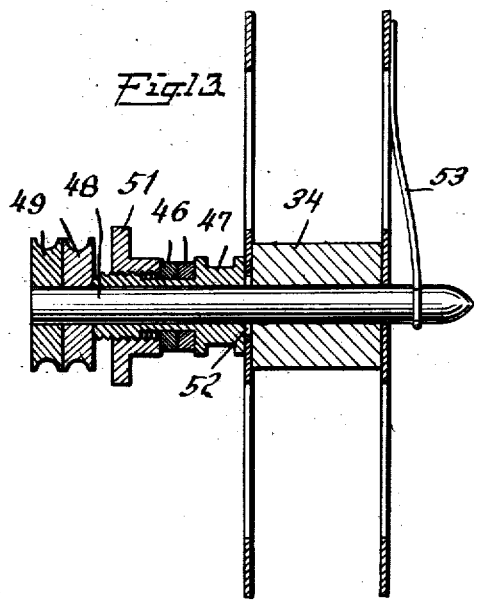
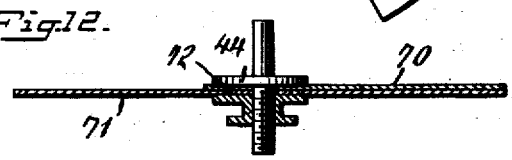

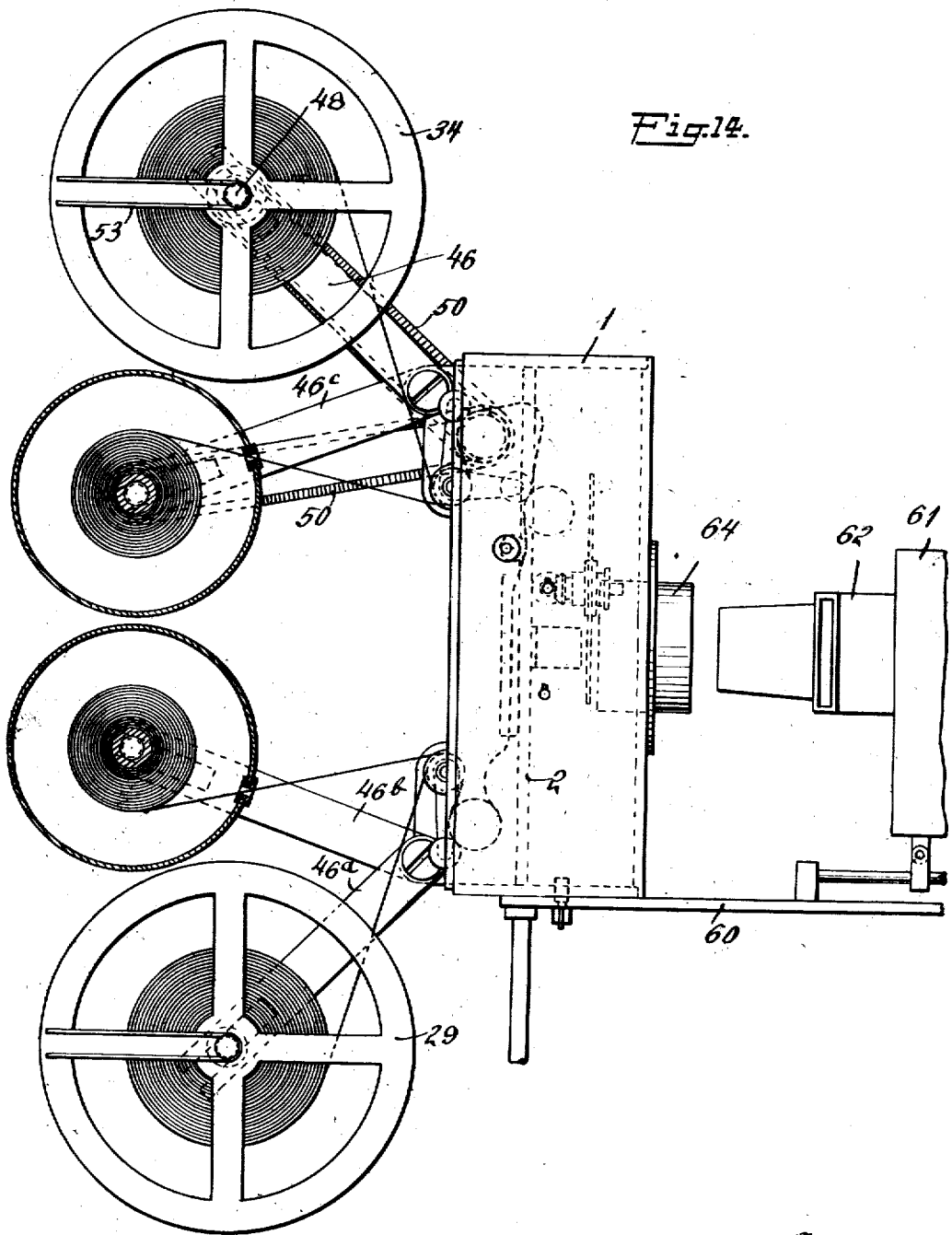

Patented Sept. 4, 1923.

1,466,774

UNITED STATES PATENT OFFICE.

ALEXANDER WASSILIEFF, OF NEW YORK, N. Y., ASSIGNOR TO MATHILDE VON HERRLICH, OF NEW YORK, N. Y.

CAMERA.

Application filed December 13, 1916. Serial No. 136,593.

*To all whom it may concern:*

Be it known that I, ALEXANDER WASSILIEFF, a subject of the Czar of Russia, residing in the borough of Manhattan, city, county, and State of New York, have invented certain new and useful Improvements in Cameras; and I do hereby declare the following to be a full, clear, and exact description of the invention, such as will enable others skilled in the art to which it appertains to make and use the same.

This invention relates to improvements in motion picture apparatus, and has for its object to provide a single mechanism particularly adapted for home or amateur use which shall have the three-fold function of a camera, a projector and a printing machine.

A further object of the invention is to provide a device of this character producing pictures equal in quality to the best produced by professional machines, the only difference being that the projected picture is of dimensions better adapted for entertainment in a room of moderate size.

A further object of the invention is to provide a mechanism of this class which is adapted to use a film made from the standard moving picture film by splitting it longitudinally so that the narrow film has on one side the full size sprocket holes of standard accurate spacing. With narrow film an accurate and positive feed may be had with the single series of sprocket holes, thereby permitting a greater area of the film to be covered with the photographic emulsion.

A further object of my invention is to provide a mechanism of such simple design as to be readily operated by any one with no special mechanical skill and which is not liable to damage even with rough usage; also to provide a mechanism of such small size and light weight as to be as easily carried as an ordinary hand camera, so that the user may produce pictures for projection as readily as snap-shots may now be obtained.

A further object of the invention is to provide a mechanism primarily adapted for the taking of negatives for the production of projected moving pictures, but which also may be used as an ordinary camera, producing small individual negatives from which enlarged prints may be made equal in every respect to the larger pictures of the ordinary hand camera.

In the accompanying drawings, I have illustrated a preferred design of my improved mechanism which has given excellent results in actual service.

In the drawings,

Figs. 2 and 3 are transverse sectional views on the correspondingly numbered lines of Fig. 1;

Fig. 4 is an elevational view of the mechanism looking from the right of Fig. 1;

Figs. 5, 6, 7 and 8 are detail sectional views on an enlarged scale showing different parts of the mechanism;

Fig. 9 is a diagrammatic view showing the path of the film through the machine;

Fig. 10 is a sectional view corresponding with Fig. 1 showing the mechanism arranged for use as a camera;

Figs. 11 and 12 are detail views of the shutter employed when the device is used as a camera;

Fig. 13 is a detail view of the reel-supporting and driving spindle; and

Fig. 14 is a view similar to Fig. 1 showing the mechanism adjusted for use as a printing machine.

Figure 1:
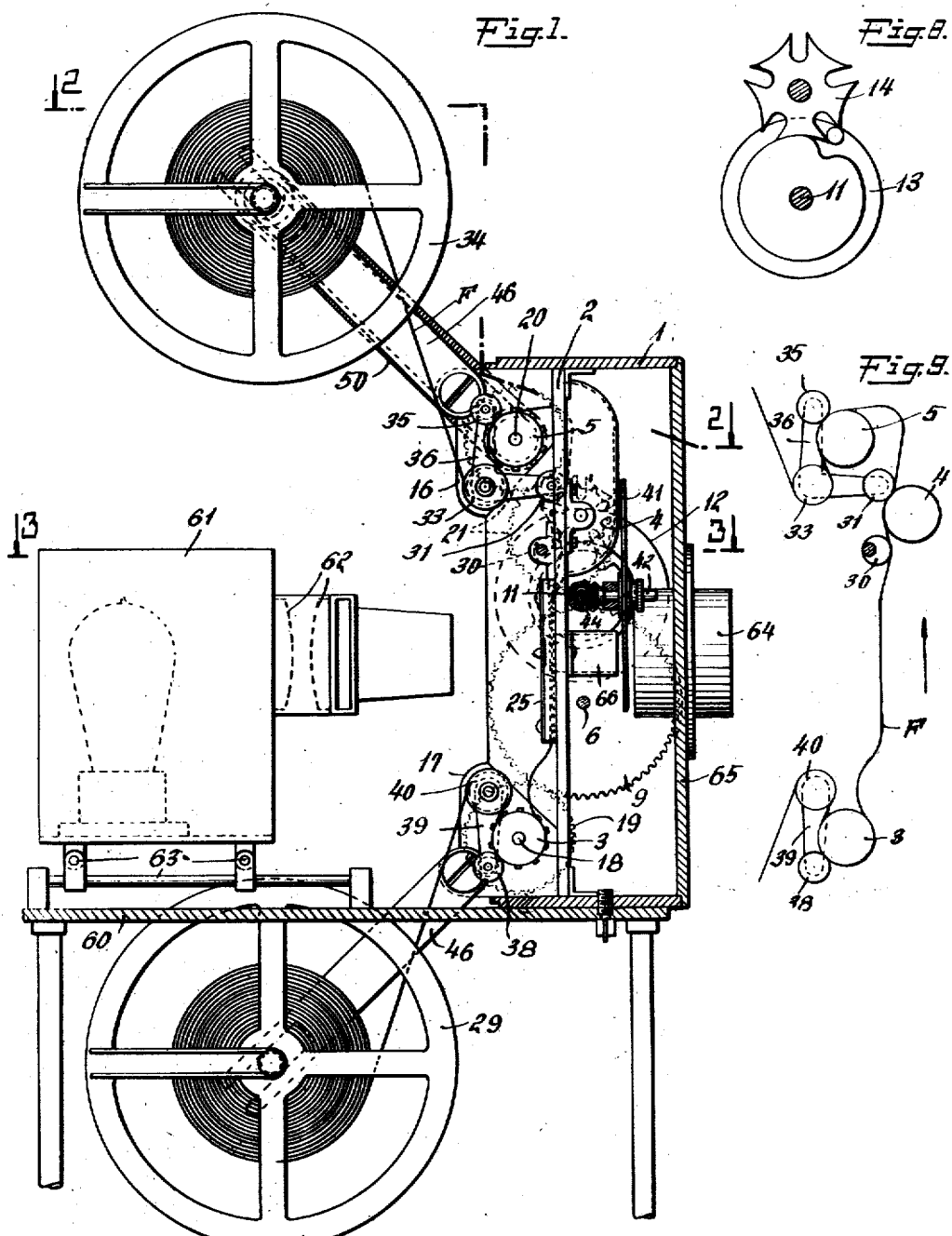
Fig. 1 is a vertical sectional view showing the mechanism arranged for projecting pictures.

Referring to the drawings, particularly to Fig. 1, 1 indicates the main casing of the machine which, as here shown consists of a rectangular frame open on its front and rear vertical faces, and provided at the middle with a vertical web plate 2 by which certain of the operative parts of the mechanism are supported.

As shown in Fig. 9, the film-feeding sprockets are three in number and comprise a lower sprocket 3 continuously driven in the operation of the machine, an intermediate intermittently driven sprocket 4, and an upper sprocket 5 also continuously driven for advancing the film to the winding up reel.

The several film-feeding sprockets are primarily driven from a hand shaft 6 extending across the machine below the projection aperture 7 as shown in Fig. 1 in the vertical web 2. The shaft 6 is supported in bearings formed in the side walls of the frame 1 and projects through the wall at one side of the machine for receiving the hand crank 8 by which the shaft is rotated. At the opposite end of the shaft within the side wall a main driving gear 9 is provided which meshes with a pinion 10 fixed to a second shaft 11 also extending across the machine and having bearings in the side walls of the frame. Also attached to the shaft 11 is a flywheel 12 and the driving member 13 of the Geneva couple through which the intermittent sprocket is driven.

The Geneva couple comprises the driving member or pin wheel 13 of ordinary construction and a star wheel 14 having five driving slots as shown more particularly in Fig. 8, whereby the star wheel will be rotated through one fifth of a complete revolution on each complete rotation of the shaft 11. The star wheel 14 is attached to the shaft of the intermittent sprocket wheel 4 which shaft is supported in suitable brackets attached to the front face of the vertical web plate 2 above the aperture 7.

The upper and lower continuous sprockets are supported in brackets 16 and 17 attached to the top and bottom walls respectively to the rear and at one side of the vertical web plate 2. The lower sprocket shaft 18 is driven directly from the main driving gear 9 by a suitable pinion 19 and the upper sprocket shaft 20 is driven at the same speed through a train of gearing 21 from the pinion 10 on the second shaft 11.

The three sprockets are of similar design and differ from the standard moving picture machine sprocket in that they are provided at the outer end only with sprocket teeth while at the inner end they are provided with a narrow smooth flange for engaging and guiding the opposite unperforated edge of the film. The diameter of the sprocket wheels is such that one fifth of one revolution of the sprocket wheel will advance the film a distance equal to the height of the projection aperture which will preferably be equal to about one half the height of the aperture of the ordinary commercial projecting machine.

The web plate 2 is cut away at its middle portion above the projection aperture for a space slightly greater than the width of the film, and extending from a point below the intermittent sprocket 4 to a point somewhat above the upper sprocket 5, and the flanges of the intermittent sprocket project through the cut away portion of the web plate as shown more particularly in Figs. 1 and 2 to a distance such that the peripheries of the flanges are substantially flush with the rear wall of the plate. At each side of the projection aperture there is attached to the rear face of the plate 2 a guide track 23 against which the film, indicated at F, is maintained taut by the tension guide carried by the gate 25, which is hinged to the rear face of the plate 2 as shown more particularly in Figs. 5 and 6. As here shown the tension guide consists of a plate 24 with marginal flanges engaging the edges of the film and having an aperture corresponding in size and position with the projection aperture of the plate 2. This plate is supported on screws 27 set in the plate and working through holes in the gate above and below the aperture whereby the plate 24 is allowed a limited movement toward and from the face of the gate. Supported between the plate 24 and the gate is a flat spring 28 consisting of a bowed piece of sheet metal of dimensions somewhat less than the plate 24. The spring is slotted at its upper and lower ends to fit over the screws 27, and is also provided with a projection aperture corresponding in position and extent with the projection aperture. The spring tends normally to hold the plate 24 away from the face of the gate, as will be apparent from Fig. 5 and when the gate is closed and latched the spring is compressed and presses the marginal guides of the plate 24 against the edges of the film.

The film passes upwardly through the tension guides from the lower sprocket 3 by which it is fed from the lower reel 29 to the intermittent sprocket against the flanges of which it is held by an eccentric roller 30 supported on the plate 2 below the sprocket and also by a pivotally supported guide roller 31, spring-held against the intermittent sprocket above its axis as clearly shown in Fig. 9.

The eccentric roller is attached to a cross shaft which is snugly fitted in its bearings attached to the plate 2. The shaft of the roller 30 projects through the side wall of the frame 1 and is provided with a head which is knurled to facilitate its rotary adjustment for the purpose of "framing" the pictures, the fit of the shaft in its bearings being sufficiently tight to hold the shaft against accidental rotation by the passage of the film over the roller. The roller is provided with flanges engaging the marginal portions of the film to prevent contact of the emulsion-bearing portion of the film with the roller. The guide roller 31 is also provided with marginal flanges, the flange engaging the toothed end of the sprocket being formed with a circumferential groove overlying the sprocket teeth.

From the intermittent sprocket the film extends upwardly in the form of a loop, thence over the upper sprocket 5 and back under a guide roller 33 rotatable on a fixed axis below the sprocket and from the guide roller to the upper reel 34 upon which the film is wound.

The film is held against the upper sprocket 5 by means of a guide roller 35 similar to the guide roller 31 for the intermittent sprocket, and carried by a swinging arm 36 integral with the arm of the roller 31, the two arms forming a bell crank lever which is pivotally mounted on the fixed shaft of the roller 33. The distance between the faces of the rollers 31 and 35 is such that both rollers are held against their respective sprockets when the film is threaded in the machine ready for operation. A spring 37 is wound around the pivot of the arms and normally holds the rollers against their sprockets.

The lower sprocket 3 is also provided with a guide roller 38 for holding the film in contact with the periphery of the sprocket. The guide roller 38 is similar in design to the guide rollers 31 and 35, and is supported by a swinging arm 39 depending from a fixed shaft supported in the lower bracket 17 at a point above and to the rear of the sprocket. The guide roller is held against the sprocket by a suitable spring, not shown, and mounted on the shaft of the arm is a flanged roller 40 over which the film passes on its way from the lower reel to the sprocket.

The light through the film is periodically intercepted by a shutter 41, as shown in Fig. 4, having three wings, one of which intercepts the light during the moment that the film is fed by the intermittent, the other two being so-called "flicker" wings for increasing the number of interruptions of the light, which insures a perfect projection without flicker. The shutter is mounted on a short shaft 42 at right angles to the sprocket shaft and supported in a bracket 43 extending from one of the side walls of the frame 1. The shutter shaft is driven directly from the shaft 11 through a pair of bevel gears 44 of equal size, whereby the shutter shaft is given one revolution for each revolution of the shaft 11 which carries the pin wheel of the intermittent, thus insuring the synchronous rotation of the intermittent feed sprocket and shutter. The shutter is held on its shaft 42 in position for properly timed operation, by means of a clamping nut threaded on the end of the shaft and clamping the shutter against a fixed collar 45 having a pin working in a properly positioned hole in the shutter, as more particularly shown in Fig. 7.

The lower and upper reels are supported by means of swinging bracket arms 46 attached at their inner ends by large-head clamping screws to the brackets 16 and 17 of the machine frame, the brackets being thus mounted in order that they may be turned toward each other to reduce the bulk of the machine for transportation and also when the machine is used as a camera, as will be later described. Each arm is made of two flat metal pieces of identical design, as shown in Figs. 2 and 3, the arms being slotted at their upper ends to detachably receive the hubs or bearings 47 of the reel shafts 48. The lower reel shaft is simply a fixed pin upon which the reel may turn, but the upper reel shaft is driven from the mechanism of the machine in order to wind up the film as it passes from the sprocket. For this purpose the reel shaft is mounted for rotation in its bearing and carries at its outer end two fixed pulleys 49 which are driven by spiral spring belts 50 from the shaft of the upper sprocket.

Fig. 13 illustrates in detail the construction of the support for the upper reel shaft. As here shown the hub 47 is provided with an extension flattened on opposite sides to fit in the forks of the two arms 46, the extension being threaded beyond the flattened portion to receive clamping nut 51 by which the hub or bearing 47 is fixedly held in the ends of the bracket arms 46. Any suitable means may be provided for maintaining the reel against rotation on the shaft, as for instance, the pin 52 set in the shaft adjacent the end of the bearing adapted to engage suitable notches in the hub of the reel, the reel being held against the pin 52 by means of a spring loop 53 on the outer face of the reel and engaging in a groove near the end of the reel shaft as shown in Fig. 13. The bracket arm 46 is composed of two members, as shown, in order that the machine may be used, as will be later described, for printing from the negatives the positives to be projected.

To facilitate the use of the machine as a projector I preferably provide a small stand 60 for supporting the machine and also the projecting lantern. The stand is composed of an L-shaped piece of metal forming a flat top and suitable legs adapted to rest when the machine is in use on a table or other support and of sufficient length to raise the lower edge of the bottom reel above the supporting surface. Any approved type of lantern may be used and I have indicated for the purpose an incandescent light having a suitable housing 61 and condensers 62 for confining and focusing the light on the projection aperture. The housing 61 is supported for adjustment toward and from the projector and also in a transverse direction upon suitable rod tracks 63 to facilitate the proper positioning of the lamp.

The projecting lens 64 is supported in a detachable front wall 65 which, with the open frame 1, forms a casing completely enclosed on all sides except at the rear. The lens tube extends within the casing to a point closely adjacent the plane of movement of the shutter, and between the rear face of the shutter and the web plate 2 I preferably provide a square tube or ray-chute 66 to prevent diffusion of the light rays.

When the machine is operated as a projector, the mechanism is set up in the manner shown in Figs. 1 to 7, and the reel of the film to be exposed placed on the lower reel shaft and threaded up through the machine, passing first over the flanged roller 40, thence under the sprocket and up through the tension guides across the projection aperture, a loop being formed between the sprocket and the lower edge of the gate, as shown in Fig. 1. Above the gate the film passes in front of the framing roller 30, thence against the rear face of the intermittent sprocket 4 against which it is held by the roller 31. From the intermittent sprocket the film extends in the form of a loop to the upper continuously driven sprocket 5, thence under the flanged roller 33 to the receiving reel mounted on the upper reel shaft which is driven in the manner described through the spring belts to wind up the film, the belts affording a friction drive to accommodate the increasing diameter of the roll of film on the reel.

As explained, the film for my improved machine may be made from standard film by slitting it longitudinally at the middle. Each reel of standard film makes two reels of equal length of film for my machine, and as the pictures are but one half the height of the standard picture a reel of one half the length will produce an exhibition of the same duration as a full length standard film. As the distance to which the film must be advanced at each movement of the intermittent sprocket is but half the distance required in standard machines, I am able to employ an intermittent movement allowing a longer period of rest in proportion to the period of movement of the film without overstraining the film or tearing the sprocket holes. As shown, I employ a 5-slot Geneva giving a ratio of 5 to 1 between the period of rest and the period of motion. This is an important advantage for the reason that it permits a narrower shutter blade to be used to obscure the motion of the film so that the flicker blades of the shutter may be made of equal width with the working blade without appreciably cutting down the amount of light, thereby practically eliminating flicker from the picture and permitting an incandescent lamp of moderate candle power to be employed.

When the machine is used as a camera for the taking of pictures to be projected, the parts are arranged as shown in Fig. 10. The only part changed to adapt the machine for use as a camera is the shutter, the three-wing shutter being removed and a shutter of the type shown in Figs. 11 and 12 being substituted. This shutter is composed of two blades 70, 71, each of 180 degrees' extent, and supported on the shutter shaft in overlapped relation, as shown. The shutter blade 70 which lies against the collar of the shutter shaft is provided with a single hole fitting the locking pin 72 while the other blade is provided with a series of holes for engagement with the pin by which the relative position of the two shutter blades may be adjusted to vary the angular extent of the shutter opening to accommodate different conditions of light, etc., met with in taking the pictures. In place of the picture-bearing strip a negative film is of course supplied, and the rear part of the machine is closed in a light-tight casing 74 in the usual manner of a camera. To reduce the bulk of the machine as much as possible the bracket arms 46 which support the reels are turned toward each other as shown in Fig. 10 so that the edges of the film boxes 73 lie within the dimensions of the machine frame 1. The rear casing 74 of the same cross section as the machine frame encloses the film boxes and forms a light-tight joint with the rear edge of the frame 1. The film boxes are preferably light-tight to permit daylight loading of the camera, and may be formed of telescoping halves having registering slots in their edges to permit the passage of the film. The walls of the slots will be covered with black velvet or some other suitable material for preventing the entrance of light to the box around the projecting end of the film. The same lens may be used for both taking and projecting pictures, but the lens is made detachable in the usual manner to permit a different lens being employed if desired.

When used as a camera it is of course essential that the part of the casing back of the plate 2 be entirely light-proof to confine the exposed portion of the film to the part opposite the aperture and prevent fogging the rest of the film by any diffusion of light from the shutter. For this purpose the space on each side of the plate 2 between the edges of the plate and the walls of the frame is closed with a sheet metal diaphragm 76 and the hole or cut-away portion of the plate above the aperture at the intermittent sprocket is closed with a cover cap 77 which completely encloses the sprocket as shown in Fig. 2.

In Fig. 14 I have shown the apparatus set up for use as a printing machine. When so used the two arms constituting each reel supporting bracket are separated as shown, one arm being adjusted to position for projection shown in Fig. 1, and the other to the position for supporting the negative film shown in Fig. 10. The outfit will include an additional reel shaft and bearing similar to that shown in Fig. 14, but having only one pulley for use in printing and also with an additional lower reel spindle of the kind heretofore described. The reel of film bearing the negative pictures from which the print is to be made will be supported on the lowermost bracket arm as shown at 46ª and the film box containing the unexposed positive film on which the print is to be made will be supported on the other arm 46ᵇ of the lower pair of bracket arms. The two films will be threaded through the machine with their emulsion faces in contact in the same manner as the single film in taking or projecting a picture. From the upper sprocket the exposed positive film passes to the upper film box on the lower arm 46ᶜ of the upper pair. This arm has attached to it the supplemental driving shaft having the single pulley and one of the two spring belts 50 will be taken off the second pulley on the upper reel shaft 48 upon which the receiving reel for the negative film is supported, this shaft being driven in synchronism with the supplemental shaft by the remaining spring belt.

In printing the picture the same stand may be used as in projecting, the machine being turned around with the shutter toward the lantern. The front wall supporting the lens may be removed or the light may be focused on the film by the lens. The printing may be accomplished without using a shutter as the two films are moved in synchronism, but sharper prints are obtained by using the shutter shown in Figs. 11 and 12 by which the light is cut off except when the film is stationary and which also permits the period of exposure to be varied. Any other suitable source of light may be used to print the picture. By the arrangement shown the ray-chute on the projecting lantern confines the light to the area of the lens and the unexposed film lies entirely within the area of the frame back of the diaphragm so that this film is entirely protected from the light.

My improved mechanism may also be used as a camera for taking ordinary pictures which when enlarged produce prints of high quality. For this purpose the end of the shaft 11 carrying the driving member of the intermittent couple is extended through the side wall of the frame 1 and provided with a clutch pin for receiving the crank handle. This shaft effects a single feeding movement of the film on each complete revolution and also produces one complete rotation of the shutter shaft which when the machine is used as a camera is equipped with the adjustable blade shutter shown in Figs. 11 and 12. The clutch pin will be so positioned in the shaft that with the handle projecting in a predetermined direction, say hanging straight down, the shutter will be closed and the two parts of the Geneva couple will be locking in position. A complete revolution of the crank will rotate the shutter and expose the film and then advance the film through a distance of one picture ready to receive the next impression. By positively feeding the film between exposures a predetermined distance, the delay and annoyance incidental to winding the film by hand as in the ordinary camera, to a point determined only by observing the film through the sight opening, is avoided, and successive pictures may be taken with much greater rapidity with my improved camera than any other instrument of which I am aware.

I claim:

1. In an apparatus of the class described, the combination of a frame having a transverse light-tight partition comprising a hood on the front side thereof and opening toward the rear, film-feeding mechanism for feeding the film along the rear of said partition, a projection aperture in said partition, and tension guides carried by said partition for maintaining the film taut at the aperture, said film-feeding mechanism comprising an intermittently driven sprocket supported on said partition and enclosed in said hood, and a continuously driven sprocket supported above said intermittent sprocket whereby said hood provides a recess protecting the loop of film between said sprockets.

2. In a motion picture apparatus the combination of a film-feeding mechanism for advancing the film through the machine, reels for supporting the film before and after its passage through the machine, and supports for said reels each comprising two parts adjustable to positions for both parts to support a single reel and to positions for each part to support a separate reel.

3. In a motion picture apparatus the combination of a film-feeding mechanism for advancing the film through the machine, reels for supporting the film before and after its passage through the machine, and supports for said reels each comprising two parts adjustable to positions for both parts to support a single reel in either of two positions and to positions for each part to support a separate reel.

4. In a motion picture apparatus the combination of a film-feeding mechanism for advancing the film through the machine, reels for supporting the film before and after its passage through the machine, and supports for said reels each comprising two parts adjustable to positions for both parts to support a single reel and to positions for each part to support a separate reel, said supports comprising driving shafts for the receiving reels and a double driving mechanism arranged for both parts to be connected to a single shaft or for each part to be connected to a separate shaft.

5. In an apparatus of the class described, a casing in two parts, each having four side walls and one open side, the edges of said side walls being shaped to fit in a light-tight joint, a partition in one of said casing parts dividing the casing into front and rear compartments, said partition having an aperture, film feeding mechanism for feeding the film along the rear wall of said compartment, said partition being substantially light-tight except at said aperture.

In testimony whereof I affix my signature.

ALEXANDER WASSILIEFF.